Patented Apr. 7, 1942

2,278,847

UNITED STATES PATENT OFFICE 2,278,847

PROCESS FOR THE SOLIDIFICATION OF A LIQUID FUEL ALLOWING THE TOTAL REGENERATION OF THE SAME FROM THE SOLID COMBUSTIBLE

Lazzaro Alfredo Greguoli, Milan, and Renato Donati, Rome, Italy

No Drawing. Application March 20, 1940, Serial No. 324,972. In Italy April 22, 1939

1 Claim. (Cl. 44—7)

Various methods are known for transforming liquid fuels, and more particularly gasoline or alcohols, into solid combustibles, which are used as such for the purpose of preventing numerous inconveniences, which in many cases, more particularly during transportation and storage, are met with when the combustibles are in the liquid state, such as their volatility and consequent losses, their low firing point, the difficulty of preventing losses through leakages and the formation of explosive mixtures by the gases evolved by them. Moreover, with the processes known and used up to the present, the liquid fuels, after having been transformed into the solid state, can no longer be brought back again to the liquid state.

The process according to the present invention, has for its object the preparation of a solid combustible or fuel from a liquid fuel without altering the original physical and chemical characteristics of this latter, so that the original liquid fuel may be easily and completely re-obtained from the solid combustible obtained.

The transformation of liquid fuels into solid combustibles according to the present invention, comprises two separate stages, the gelatinizing, and the stabilizing stage.

Both the gelatinizing and the stabilizing substances that are brought into contact with the liquid fuel undergoing solidification, are chemically inert with respect to said liquid fuel, said substances being moreover insoluble and adapted to subdivide and to include the liquid combustible in the form of very minute droplets contained into cellular cavities.

The first or gelatinizing stage of the process consists in mixing cold and with strong agitation the liquid fuel with one or more gelatinizing substances such as keratine, gluten, algin, pectine and the like, during a period of 15–20 minutes, thus obtaining a product having a gelatinous consistency.

Subsequently (second stage) to the mass thus obtained is added a small quantity of one or more metallic salts rich in oxygen, which may be peroxides, sulphates, persulphates, chromates, bichromates, borates, perborates, manganates, permanganates and the like, or tannin, oxymethylene, etc., either in the solid, liquid, or gaseous state, and continuing to mix, continually stirring, for another 4 or 5 minutes.

The final product thus obtained, is left to rest for a period of 12–24 hours, thereby obtaining a semi-solid mass containing the liquid combustible subdivided and enclosed in the micro-cells of the mass, which is retained therein even when the mass is subjected to relatively high pressures, but without any crushing action, either under storage conditions or during transportation from one place to another.

The product, which is to be adapted to be stored and conveyed, is transferred before solidification into impermeable paper, or tissue, bags, or into boxes or cases, without contacting with the air, or in water.

For effecting the process of solidification, any suitable mechanical agitator may be used.

The liquid fuel contained in the semisolid mass obtained with the process above described, may be recovered completely in its previous natural state by first subjecting the mass to a crushing action, in a suitable crusher such as a roller mill, with the object of breaking up the gelatinous microcells of the mass, and subsequently treating the solid and semigelatinous residues resulting from said crushing action, by mixing said residues with products having an alkaline reaction, or anti-colloidal products, having the characteristic of being absolutely inert with respect to the fuel, for the purpose of recovering completely the liquid fuel from the residues of the crushed semi-solid mass.

Such products may be sodium or potassium hydrate, or other suitable substances, the treatment being effected either in the cold or hot state for about one hour, the paste resulting from said mixture being subsequently treated in an hydroextractor, in an hydraulic press or in any other suitable separator, for recovering the liquid fuel from said residues.

The following examples relate both to the preparation of a semi-solid combustible from a liquid fuel, and to the integral recovery of this latter from the semi-solid combustible produced in accordance with the present invention, however these examples are not intended to limit in any way the scope of the invention, which may comprise other support substances, other dosages and other types of mixing and crushing machines than those mentioned in the examples.

*Example I.*—100 c. c. of gasoline are mixed and strongly agitated with 4 grammes of gluten for a period of 20 to 30 minutes, by means of a mechanical agitator. To the gelatinous mass resulting after said agitation, is added about 1 gram of basic chromium sulphate, continuing the agitation for another 4 to 5 minutes. The gelatinous mass thus obtained is transferred into impermeable paper or cloth bags, out of contact with the air, in which, after about 18 hours it assumes a semi-solid consistency, and is capable to withstand relatively high pressures without crushing action.

*Example II.*—100 grammes of gasoline, solidified as described in Example I, are subjected to a crushing operation in a roller mill, in order to recover from the solidified mass the greater portion of the liquid fuel.

The solid residues obtained from said crushing operation, are treated with an aqueous solution containing about 0.5 gram of caustic soda or of caustic potash, either cold or hot. The bath of said residues in said alkaline solution has the duration of about one hour, after which the resulting mass of the residues is treated in a suitable hydro-extractor for separating in the liquid state the fuel contained in said residues.

We claim:

A process for preparing a solid combustible from a liquid fuel in such physical condition that said liquid fuel may be recovered integrally from said solid combustible, which consists in first producing a gelatinizing stage by cold treating the liquid fuel under strong agitation with an insoluble nitrogen containing substance chemically inert with respect to said liquid fuel, comprising gluten, thereafter, in a second stage treating the resulting gelatinous mass formed in the first stage by mixing said mass under agitation, with a metallic salt rich in oxygen, comprising a basic chromium sulphate, and subsequently allowing the finally resulting mass to rest for a predetermined period of time while preventing access of air to said mass during said period of time.

LAZZARO ALFREDO GREGUOLI.
RENATO DONATI.